W. O. McKINLAY.
TROLLEY WHEEL.
APPLICATION FILED NOV. 2, 1915.

1,231,630.

Patented July 3, 1917.

WITNESSES
Carroll Bailey
J. P. Campbell

INVENTOR
William O. McKinlay
BY Richard Oliver
ATTORNEY

UNITED STATES PATENT OFFICE.

WILLIAM O. McKINLAY, OF WESTPORT, WASHINGTON.

TROLLEY-WHEEL.

1,231,630.  Specification of Letters Patent.  Patented July 3, 1917.

Application filed November 2, 1915. Serial No. 59,279.

*To all whom it may concern:*

Be it known that I, WILLIAM O. MCKIN-LAY, a citizen of the United States, residing at Westport, in the county of Grays Harbor and State of Washington, have invented certain new and useful Improvements in Trolley-Wheels, of which the following is a specification.

My invention relates to new and useful improvements in trolley wheels.

The primary object of the invention is the construction of a trolley wheel having means for holding it upon the wire.

A further object of the invention is the provision of an attachment as above described which will normally rotate with the wheel, but which will be prevented from rotating when engaged by the wire.

A still further object of the invention is the provision of means for holding the attachment against the side of the wheel whereby it will normally rotate with the wheel.

Figure 1:
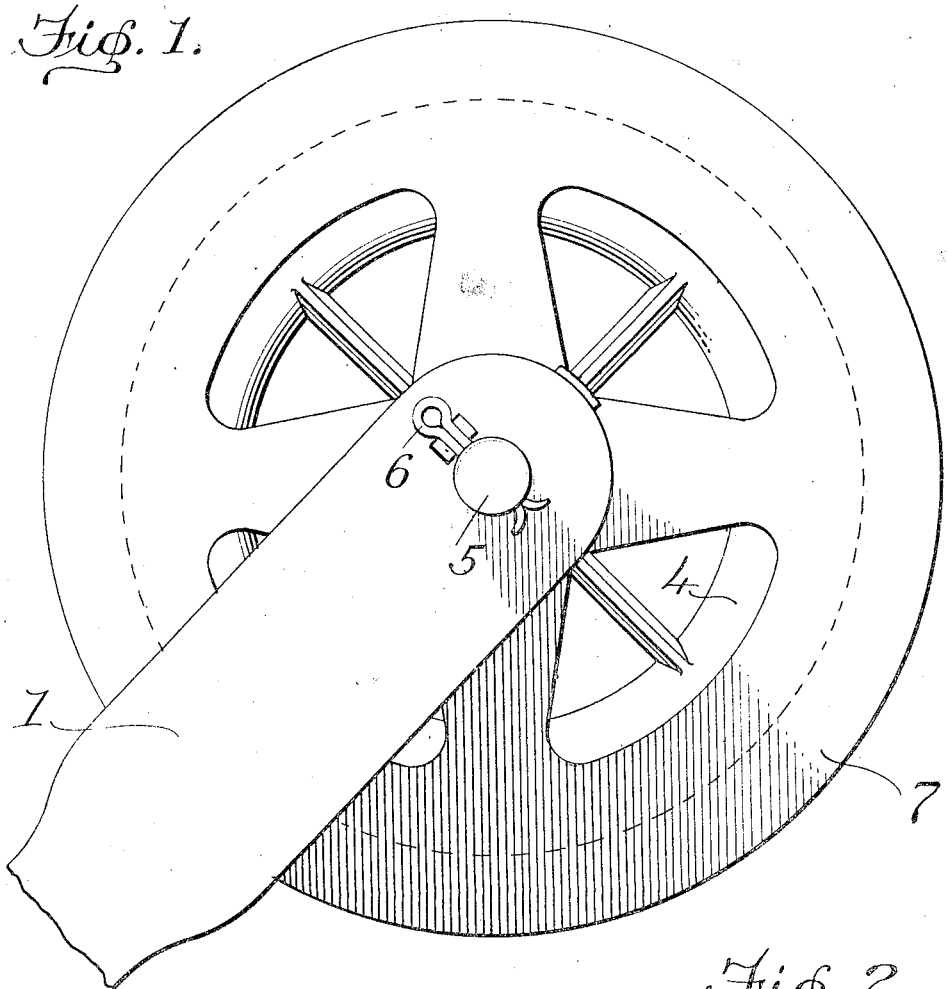
Figure 2:
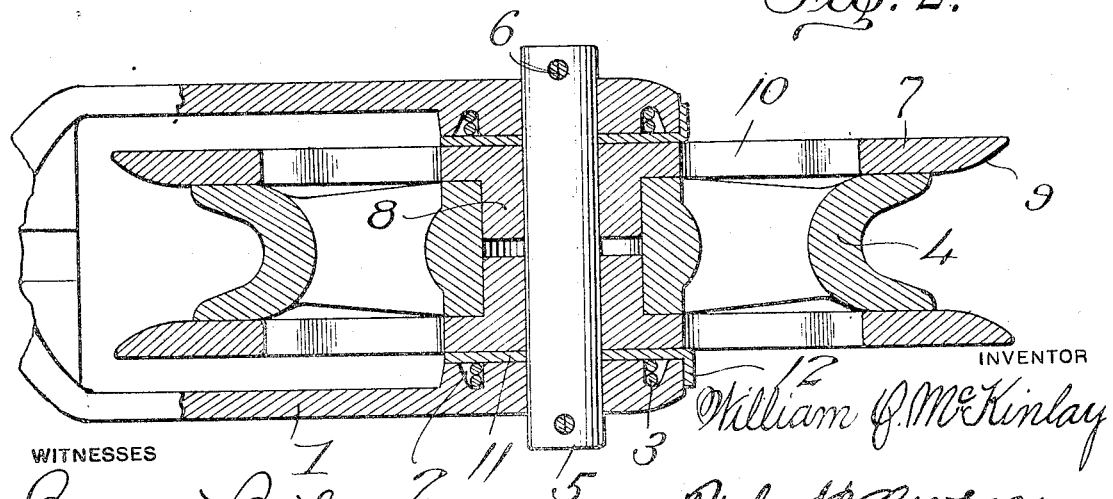

With these and other objects in view the invention consists in the novel details of construction and arrangement of parts which will be more clearly understood from the following description and drawings, in which, Figure 1 is a side elevation, and Fig. 2 is a vertical section through the wheel, the attachment and harp.

In the drawings the numeral 1 indicates the harp which is formed on the top of the usual trolley pole and the harp is provided on its inner faces with circular recesses indicated at 2 adapted to receive the coil-springs 3, the purpose of which will be presently described. As is clearly shown in Fig. 2 of the drawings the upper ends of the harp are somewhat thicker than the remainder of the harp whereby it will not be weakened or its strength reduced by forming the grooves 2 therein.

The trolley wheel is indicated at 4 and is provided with the usual circumferential groove for receiving the trolley wire and the central bore of the wheel is formed of a larger diameter than is usually the case in wheels of this character, the purpose of which will be presently described. A rod 5 passes through openings formed in the harp and through the central opening of the wheel and transverse pins 6 extend through each end of the rod 5 on the outside of the arms of the harp thereby holding the rod in position.

Plates 7 having enlarged hub sections 8 are rotatably mounted upon the rod between the arms of the harp and the wheel, and as is clearly shown in Fig. 2 of the drawings, the hub sections 8 are of such a diameter as to be received within the central opening of the wheel 4. The hub sections 8 are of such a length that they will not meet within the wheel, but are spaced apart, as is clearly shown in the drawings. The interior upper edge of the plates 7 are beveled as is clearly shown at 9 and in order to reduce the weight of the plates they are provided with the spaced openings indicated at 10.

Bearing plates 11 are received upon the rod 5 between the arms of the harp 1 and the plates 7 and are provided with extensions 12 adapted to be bent over the ends of the arms of the harp to prevent the plates 11 from rotating upon the rod 5. As is clearly shown in the drawings the coil-springs 3 bear against the plates 11 and hold the same in contact with the plates 7, thereby holding the plates 7 in frictional engagement with the wheel 4.

Having fully described the detailed construction of my improvements it is thought that the advantages and operation will be clearly understood. It is my purpose to provide a trolley wheel having an attachment whereby the wheel will not be easily disengaged from the trolley wire at the same time providing a device of this character which is simple and inexpensive in construction. As will be understood the trolley wire is adapted to be received in the circumferential groove formed in the outer face of the wheel. The plates 7 being held in frictional engagement with the wheel 4 will normally rotate therewith, but should the trolley wire leave the groove in the wheel, it will engage with the beveled surface 9 of the plates 7. The contact of the wire with the surface above described, will cause resistance to the rotation of said plate. The trolley wire is ordinarily caused to jump from the wheel owing to the fast rotation of the wheel which throws the wire therefrom. The plates 7 being stopped from rotation when engaged by the wire will hold the wire and guide it back into the groove in the wheel 4. By providing the coil-springs 3, the plates 7 are held in frictional contact with the wheel 4, as above described and the springs are inclosed in such a manner that it is impossible for dirt or other foreign substances to enter and in any way damage the springs. It will also be noted that the wheel 4 rotates upon the hub-sections 8 of the plates 7 and not upon the rod 5. However, the plates 7 rotate upon the rod as previously described.

It will be understood that I provide the usual lubricating means whereby both the wheel and plates will readily rotate.

Having fully described my invention what I claim as new and desire to secure by Letters Patent is:

1. The combination with a trolley harp having a wheel rotatably mounted thereon, of guards normally rotating with said wheel but adapted to be held stationary at times to retard the speed of the wheel.

2. The combination with a trolley harp, of plates rotatably mounted in the harp, said plates equipped with hubs, and a wheel rotatable upon the hubs.

3. The combination with a trolley harp, of plates rotatably mounted therein, said plates equipped with hubs, a wheel rotatably mounted upon the hubs, and means for holding the plates in frictional contact with the wheel.

4. The combination with a trolley harp, of plates rotatably mounted therein, said plates equipped with hubs, a wheel rotatably mounted upon the hubs, and coil-springs secured to the harp and engaging with the plates.

5. The combination with a trolley harp having grooves formed therein, coil-springs received within the grooves, plates rotatably mounted within the harp, said plates equipped with hubs, and a wheel rotatably mounted upon the hubs.

6. The combination with a trolley harp having circumferential grooves formed therein, of springs received in the grooves, plates rotatably mounted within the harp, said plates equipped with hubs, a wheel rotatably mounted upon the hubs, and washers received between the springs and plates.

7. The combination with a trolley harp, of a rod extending transversely of the harp, plates rotatably mounted upon the rod, said plates equipped with hubs, and a wheel rotatably mounted upon the hubs.

8. The combination with a trolley harp, having grooves formed therein, of a rod extending transversely of the harp, washers received upon the rod, springs received within the grooves and bearing against the washers, plates rotatably mounted upon the rod, said plates equipped with hubs, and a wheel rotatably mounted upon the hubs.

9. The combination with a trolley harp, of a rod extending transversely of the harp, plates rotatably mounted upon the rod, said plates being beveled at the outer edge, and equipped with hubs, and a wheel rotatably mounted upon the hubs.

In testimony whereof I affix my signature in presence of two witnesses.

WILLIAM O. McKINLAY.

Witnesses:
T. L. MILES,
E. B. BENN.